G. STAPLES.
ATTACHING DEVICE FOR NONSKID CHAINS.
APPLICATION FILED APR. 15, 1920.

1,420,778.

Patented June 27, 1922.

Inventor
George Staples,
By Morsell & Keeney,
Attorneys.

UNITED STATES PATENT OFFICE.

GEORGE STAPLES, OF OSHKOSH, WISCONSIN, ASSIGNOR TO STAPLES AND SEEFELD, OF MILWAUKEE, WISCONSIN, A MILWAUKEE COPARTNERSHIP.

ATTACHING DEVICE FOR NONSKID CHAINS.

1,420,778.    Specification of Letters Patent.    Patented June 27, 1922.

Application filed April 15, 1920. Serial No. 374,211.

*To all whom it may concern:*

Be it known that I, GEORGE STAPLES, a citizen of the United States, and resident of Oshkosh, in the county of Winnebago and State of Wisconsin, have invented new and useful Improvements in Attaching Devices for Nonskid Chains, of which the following is a description, reference being had to the accompanying drawings, which are a part of this specification.

The present invention relates to certain new and useful improvements in attaching devices for anti-skid chains and has for one of its objects to provide a simple, effective, and reliable device securable to a vehicle wheel and to which the ends of a tread member extending transversely across the wheel tire can be easily connected or disconnected.

Another object of this invention is to provide an attaching device for non-skid chains having a hook for receiving one end of a tread member and provided with means for closing the throat of the hook to releasably secure the tread member end therein.

A further object of my invention is to provide an attaching device of the class described in which the spring latch is of special construction to prevent the sliding thereon of the adjacent tread member end and in which the bracket member of the device is provided with means for permitting the ready depression of the spring latch for the easy removal from the hook of the tread member end.

A still further object of my invention is to provide an attaching device of the class described which may be secured either to the wheel felly or to the spokes thereof.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawing I have illustrated one complete example of the physical embodiment of my invention constructed according to the best mode I have so far devised for the practical application of the principles thereof, and in which.

Figure 1:
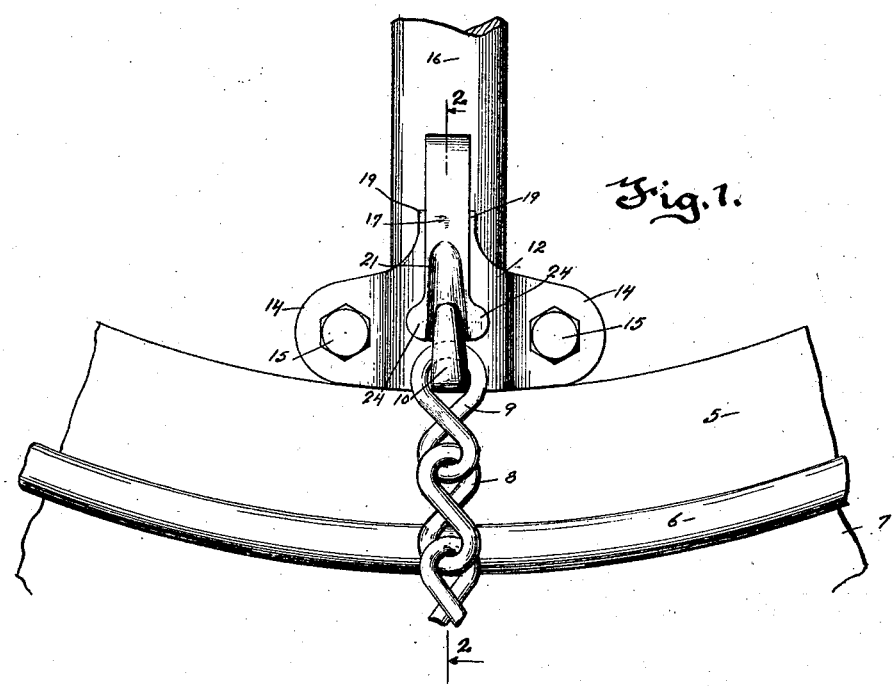
Figure 1 is a side view of a portion of a vehicle wheel equipped with one of my improved non-skid chain attaching devices.
Figure 3:
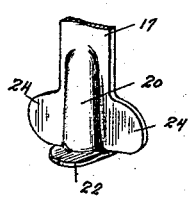
Figure 3 is a fragmentary perspective view of the free end of the spring latch for closing the throat of one of the tread member end receiving hooks.

In the accompanying drawing, 5 designates a vehicle wheel felly, 6 a tire rim secured to the outer periphery thereof, 7 a tire secured in the rim and of any desired type, and 8 a tread member or non-skid chain extending transversely across the periphery of the tire and having its terminal links 9 engageable with hooks 10 and 11 of my improved attaching device.

In the present instance, I have illustrated my attaching device as consisting of two clamp members or sections 12 and 13 provided with complementary projecting ears or lugs 14 through which clamping bolts 15 pass to firmly secure the device upon any of the spokes 16 of the wheel.

Figure 2:
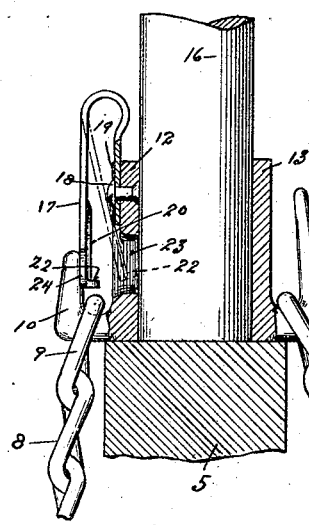
Figure 2 is a view part in section and part in elevation taken through Figure 1 on the plane indicated by the line 2—2.

The tread member or chain 8 is provided with a slight slack as best shown in Figure 2, and the hooks are extended inwardly toward the center of the wheel and the hook 11 is extended beyond the end of the hook 10 a distance greater than the slack of the tread member. With this construction, the tread member 8 cannot be removed without first removing the terminal link thereof engaged with the shorter hook 10, for, as above stated, the slack of the tread member is insufficient to permit the removal of its terminal link engaged with the longer hook 11 without first disengaging its other terminal link from the shorter hook 11.

The present invention refers more particularly to means for releasably securing the terminal link 9 upon the hook 10, which means consists of a spring latch 17 normally closing the throat of the hook 10. The spring latch 17 is formed by a length of flat spring material having one end secured as at 18 to the clamp member 12 and has its other end folded thereover and extending down into the space between the member 12 and the hook 10, the spring or resiliency of the material at all times urging the free end or latch portion thereof into engagement with the hook 10, thus closing the throat thereof.

The end of the spring secured to the clamp 12 is preferably seated between two ridges or ribs 19 to insure the rigid connection of the spring with the member 12. The free end of the spring is struck inwardly as at 20 to provide a slight channel or depression 21 in alinement with the hook 10, and the extreme inner end of the spring has an inwardly projecting lip or lug 22 extending inwardly toward the clamp member 12 and spaced therefrom a distance less than the thickness of the adjacent terminal link 9 to prevent the sliding of the terminal link upwardly from the hook 10 onto the spring 17. As depicted in Figure 2, the clamp member 12 is recessed as at 23 adjacent the free end of the spring so that the lug 22 may pass therein when the spring is depressed to permit the ready and free removal of the adjacent terminal link 9.

In the event that the adjacent terminal link 9 should jump or pass the lip 22, the same will be prevented from sliding onto the spring by two oppositely extending ears 24, the distance of which between the tips thereof is greater than the width of the eye of the terminal link 9.

From the foregoing description taken from the accompanying drawing it will be readily apparent to those skilled in the art to which an invention of this character appertains, that I have provided a simple but efficient attaching device for non-skid chains which is capable of ready securement to a vehicle wheel and which will perform its functions in an efficient manner.

What I claim as my invention is:

1. An attaching device for non-skid chains comprising two hook members with which the terminal links of a tread chain are engageable, a spring latch member adapted to bear against the inner side of one of said hook members thereby releasably closing the throat of said last mentioned hook member to retain the adjacent terminal link in engagement therewith, an inwardly extending lip carried by said latch member and projecting across the throat of said hook member, and laterally projecting ears formed on the inner end of said latch member whereby said latch member is of a greater width at its inner end than the adjacent terminal link.

2. An attaching device for non-skid chains comprising a base member having two hooks with which the terminal links of a tread chain are engageable, and a spring latch having one end fixed to said base member and its opposite end bearing against the inner side of one of said hooks, the last mentioned end of said latch being of U shape in cross section and said base member being recessed to receive the U-shaped portion of the latch when it is in non-operative position.

3. An attaching device for non-skid chains comprising a base member having two hooks with which the terminal links of a tread chain are engageable, and a spring latch having one end fixed to said base member and its opposite end bearing against the inner side of one of said hooks, the last mentioned end of said latch being of U- shape in cross section and said base member being recessed to receive the U-shaped portion of the latch when it is in non-operative position, said latch having an inwardly extending lip projecting across the throat of said last mentioned hook, for the purpose described.

In testimony whereof, I affix my signature.

GEORGE STAPLES.